(12) United States Patent
Munir et al.

(10) Patent No.: US 11,500,854 B2
(45) Date of Patent: Nov. 15, 2022

(54) SELECTIVE DATA SYNCHRONIZATION TO TROUBLESHOOT PRODUCTION ENVIRONMENT FAILURES

(71) Applicant: International Business Machines Corporation, Armonk, NY (US)

(72) Inventors: Kushal S. Munir, Ontario (CA);
Edmund H. Reinhardt, Ontario (CA);
Hoi Wing Holman Sze, Ontario (CA);
Trong Truong, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 932 days.

(21) Appl. No.: 14/929,143

(22) Filed: Oct. 30, 2015

(65) Prior Publication Data
US 2017/0124141 A1    May 4, 2017

(51) Int. Cl.
G06F 16/23    (2019.01)
G06F 11/07    (2006.01)
G06F 11/34    (2006.01)
G06F 16/27    (2019.01)

(52) U.S. Cl.
CPC ........ *G06F 16/2379* (2019.01); *G06F 11/079* (2013.01); *G06F 11/0781* (2013.01); *G06F 11/3476* (2013.01); *G06F 16/2358* (2019.01); *G06F 16/27* (2019.01); *G06F 2201/87* (2013.01)

(58) Field of Classification Search
None
See application file for complete search history.

(56) References Cited

U.S. PATENT DOCUMENTS 5,524,239 A * 6/1996 Fortier ................ G06F 11/1471
5,778,386 A * 7/1998 Lin ......................... H01L 22/20
7,409,587 B2   8/2008 Perry
(Continued)

OTHER PUBLICATIONS

"Using Rules and Data Dependencies for the Recovery of Concurrent Processes in a Service-Oriented Environment" (herein as 'Xiao'). (Year: 2012).*

(Continued)

*Primary Examiner* — Amresh Singh
*Assistant Examiner* — Jermaine A Mincey
(74) *Attorney, Agent, or Firm* — Garg Law Firm, PLLC; Rakesh Garg; Stephanie Carusillo (57) ABSTRACT

In a production environment, an entry is logged in a log journal to represent a read operation on a record of a file. A problematic transaction in a batch job is selected and set of operations performed by the problematic transaction is intercepted. The set includes a combination of read, write, update, delete operations, and operations that use external resources. A window of entries is determined in the log journal where the entry is a beginning entry in the window and an ending entry is a last entry captured in the log journal before detecting the error. From the window, those entries are filtered that correspond to the record. A final value of the record is copied from the production environment to a development environment and rolled back in the development environment to an initial value stored in the beginning entry. The problematic transaction is performed in the development environment.

17 Claims, 6 Drawing Sheets

(56) References Cited

U.S. PATENT DOCUMENTS

| | | | |
|---|---|---|---|
| 8,473,953 B2* | 6/2013 | Bourbonnais | G06F 11/1474 |
| | | | 707/703 |
| 9,367,298 B1* | 6/2016 | Eng | G06F 9/44505 |
| 9,767,177 B1* | 9/2017 | Richardson | G06F 11/1469 |
| 2003/0140041 A1* | 7/2003 | Rosensteel, Jr. | G06F 3/0601 |
| 2010/0057865 A1 | 3/2010 | Chan et al. | |
| 2013/0007535 A1 | 1/2013 | Beard | |

OTHER PUBLICATIONS

Milos Prvulovic; "ReEnact: Using Thread-Level Speculation Mechanisms to Debug Data Races in Multithreaded Codes"; IEEE;2003; pp. 12 (Year: 2003).*

Subhraveti et al; Record And Tran splay: Partial Check pointing For Replay Debugging Across Heterogeneous Systems, ACM New York, NY, USA, 2011.

* cited by examiner

| TRANSACTION 502 | PROCESSING LOGIC 504 |
|---|---|
| DATA READ | IF DATA DOES NOT EXIST ON DEV,<br>- COPY THE DATA FROM PROD TO DEV<br>- ON DEV, ROLLBACK ANY CHANGES TO THIS PIECE OF DATA CAPTURED IN THE JOURNAL |
| DATA UPDATE | IF DATA DOES NOT EXIST ON DEV,<br>- COPY THE DATA FROM PROD TO DEV<br>- ON DEV, ROLLBACK ANY CHANGES TO THIS PIECE OF DATA CAPTURED IN THE JOURNAL<br>- PERFORM THE UPDATE ON DEV,<br>ELSE<br>- PERFORM THE UPDATE ON DEV |
| DATA WRITE | - WRITE THE DATA TO DEV |
| DATA DELETION | IF DATA EXISTS ON DEV,<br>- DELETE THE DATA |
| USE OF EXTERNAL REFERENCE (e.g., PROGRAM CALL) | IF EXTERNAL OBJECT IS NOT ON DEV,<br>- COPY THE EXTERNAL REFERENCE |

SELECTIVE DATA SYNCHRONIZATION TO TROUBLESHOOT PRODUCTION ENVIRONMENT FAILURES

TECHNICAL FIELD

The present invention relates generally to a method, system, and computer program product for debugging a failure in a data processing environment. More particularly, the present invention relates to a method, system, and computer program product for selective data synchronization to troubleshoot production environment failures.

BACKGROUND

A production data processing environment, or production environment (PE), is a configuration of data processing systems using which an operator of the data processing environment provides a service to an actual user, such as a business providing a service to a customer. For example, a banking organization operates a production data processing environment using which an actual customer of the banking organization performs a transaction with real money in the customer's account.

A development data processing environment, or development environment (DE), is a different configuration of data processing systems using which the operator of the production data processing environment develops, tests, or troubleshoots a service that is either being provided to the actual user in the operator's production environment, or is planned to be provided to the actual user in the operator's production environment. For example, the banking organization operates a development data processing environment in which either a customer transaction is simulated or a transaction from the production environment is recreated. For example, an actual customer of the banking organization does not interact with the development environment to perform a transaction with real money in the customer's account.

The separation between a production environment and a development environment is important for a variety of reasons. For example, when a new service is being developed, it is likely that the service may not be stable and cause a system crash or data corruption. Therefore, the development or testing of the service is not desirable in the production environment, where a system crash can adversely affect other customer transactions, and where data corruption can, for example, corrupt real account balances. Therefore, the development and testing activities are performed in a development environment where a system crash, data corruption, or other adverse events do not disrupt the business operations of the operator of the production environment.

As another example, when an existing service encounters a failure in the production environment, it is undesirable to troubleshoot the service in the production environment for similar reasons. For example, the troubleshooting activities in the production environment can adversely affect real customer transactions, cause a disruption of a system or service, or corrupt the production environment's data. Therefore, the troubleshooting activities to determine and remedy a cause of a failure in the production environment are performed in a development environment where a system crash, data corruption, or other adverse events do not disrupt the business operations of the operator of the production environment.

SUMMARY

A method according to one embodiment includes logging, in a production environment, an entry in a log journal, the entry representing a read operation performed on a record of a file, the file being listed in a master file of a batch job. The method further includes selecting a problematic transaction in the batch job. The method further includes intercepting, for the problematic transaction, a set of operations performed by the problematic transaction, the set of operations comprising a combination of the read operation, a write operation, an update operation, and a delete operation. The method further includes determining a window of entries in the log journal, wherein the entry is a beginning entry in the window of entries and an ending entry is a last entry captured in the log journal before detecting the error. The method further includes filtering from the window of entries those entries that correspond to the record. The method further includes copying, from the production environment to a development environment, a final value of the record. The method further includes rolling back, in the development environment, the final value to an initial value stored in the beginning entry. The method further includes performing the problematic transaction in the development environment.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Essentially, a problem in a production environment, such as a failure of a service in the production environment, entails a malfunction of a system, incorrect manipulation of data, or faulty operation of code. Debugging is the process of determining a cause of a problem and locating an operation that is a suspect in causing the problem.

Many debugging tools (debuggers) are presently available for this purpose. Debugging is not desirable in a production environment for the reasons described earlier. Often, a debugger is deployed, and the debugging is performed in a development environment.

In order to be able to debug a problem, it is often necessary to recreate the environment in which the problem occurred. For example, if a banking transaction fails to make a change to a customer's account in a production environment of a banking system, troubleshooting the transaction and finding a cause of the problem requires not only the information about the transaction but also information about what else was occurring in the production environment when the transaction failed. For example, the transaction may have failed because too many other processes were trying to simultaneously access particular data, the data was in an improper state because of a previous transaction, and many other such reasons.

The illustrative embodiments recognize that given such interdependencies between the events and data of a production environment, a troubleshooting activity cannot be effective in a development environment unless the development environment can mirror the interdependencies that existed in the production environment. The illustrative embodiments further recognize that it is not sufficient to just copy or recreate the interdependencies, but a state of such interdependencies must be accurately replicated in the development environment from the time at which the problem occurred in the production environment.

The illustrative embodiments recognize that because of the speed at which events occur and data changes in a production environment, presently, when a problem occurs in a production environment, a user's best option is to connect to the production environment and troubleshoot the problem in real-time as fast as possible and as close in time of the problem as possible. For the reasons described above, the illustrative embodiments recognize that such an approach is undesirable.

The illustrative embodiments further recognize that under some circumstances, when a problem occurs in a production environment, a snapshot of the state of the data is captured from the production environment and a record of a series of events, which occurred in the production environment from some arbitrary point in time, is saved. The data snapshot and the record of events is then used to reconstruct the state of the production environment in a development environment, in which a user attempts to recreate the problem.

The illustrative embodiments recognize that even this approach is undesirable. For example, presently, the snapshot of the data captures all or a substantially large portion of the data from the production environment, which has to be copied over from the production environment to the development environment.

Furthermore, presently, the time at which the record of the events begins is either as far back as a routinely saved known-good state of the production environment, or from the beginning of a day, hour, or some other arbitrary time. The illustrative embodiments recognize that such an approach to recreating the events either goes too far back or not far enough back in time to be helpful in the troubleshooting efforts.

The illustrative embodiments recognize that when such large volumes of data copied over from the production environment are combined with such arbitrary records of events, the troubleshooting process becomes cost prohibitive and unmanageable. Furthermore, the illustrative embodiments recognize that such an approach still cannot guarantee that the suspect operation will be found by this exercise.

The illustrative embodiments used to describe the invention generally address and solve the above-described problems and other problems related to setting up a development environment to troubleshoot a production environment problem. The illustrative embodiments provide a method, system, and computer program product for selective data synchronization to troubleshoot production environment failures.

An embodiment can be implemented as a software application. The application implementing an embodiment can be configured as a modification of an existing debugging tool, or as a separate application that operates in conjunction with an existing debugging tool.

Within the scope of the illustrative embodiments, a master file is a data structure of any suitable form and type in which identifiers of other data structures can be stored. For example, a master file may be constructed to include a list of filenames of files, table names of tables, an object in a collection of data encapsulated as objects.

Within the scope of the illustrative embodiments, a file can be any suitable data structure, including but not limited to a document saved as a file-system file or a table in a database. A filename is any suitable manner of referencing such a file. For example, a filename of a file-system file can be an identifier by which the file is identified in the file-system. A filename of a table in a database can be a table name by which the table is known in the database.

A master file described herein includes such filenames. In other words, a record in a master file is a filename. A record in a file is an entry in a file that is uniquely identifiable within the file.

A batch job, or simply "job", is a collection of transactions that have been batch processed in a data processing environment. A transaction in a batch job manipulates an entry in a file identified in a master file. For example, many banking transactions of many banking customers may be processed in a batch job, and applied to various tables in a banking database, when the batch job is executed. Within the scope of the illustrative embodiments, a batch job can take any suitable form, including but not limited to an executable code, a non-executable list of transactions, a combination of a non-executable list of transactions and an executable code, an executing process, or an input to an executing process.

A log journal, or simply "journal" is a record of operations or manipulations performed on one or more files. For example, a log journal entry includes information about which entry in which file is touched at what time. Touching a file or an entry therein includes accessing the file, opening the file, locking the file, unlocking the file, reading the file entry, writing a file entry, or locking the file entry, or some combination of these and other interactions. The illustrative embodiments presume that all read operations on the records in the files are logged in the log journal.

A master file according to the illustrative embodiments lists all files in a production environment used by a particular batch job. A transaction in a batch job can touch only those files which are listed in the master file. A transaction in a batch job may touch no files or entries, one or more files, or one or more entries in one or more files.

Furthermore, not all transactions that touch a file or a record may be listed in a batch job. For example, aside from the transactions in a batch job, other batch jobs in a production environment may also touch files or entries in the production environment. Accordingly, the entries in a log journal include not only the records of the files or entries touched by the problematic batch job but also the records of the files touched by other batch jobs in the production environment. However, for the result to be deterministic, it can be assumed that no batch job is concurrently accessing the same records as the others.

An embodiment determines that a problem, such as an error or a failure, has occurred in a production environment. Given a master file of the production environment, the embodiment identifies that entry in the log journal in the production environment when a record in a file identified in the master file was first read. On many systems the initial read is not logged, so some database or operating system level function is needed to track the initial read (or update) and the values of the record's columns at that time. For example, IBM DB2 database for IBM i supports read triggers, which are fired when data is read. Logging of read or update operations should be setup in a given implementation of an embodiment before a failure occurs in the implementation. The embodiment marks the time indicated by this entry as the beginning of a window. The embodiment marks the time when the error occurred as the end of the window.

If all transactions are independent of each other, the embodiment could optionally further reduce the scope of the considered data by creating a filtered view of the data that only contains the data used by the problematic transaction which caused the batch job error. The embodiment uses only those entries in the identified window of journal entries that are for each of the files touched by the transaction in the batch job for the data synchronization. Each touched record in each touched file has its corresponding window, which begins at a different time, which is when the entry is first touched, which could be by a READ, UPDATE, WRITE or DELETE operation. However, they all end at the same time, which is the time when the error occurred.

The embodiment starts a special debugging session for the batch job, which intercepts READ, UPDATE, WRITE and DELETE database operations. During the special debugging session, when a record is copied from the production environment to the development environment, the value of the copied record is referred to as the final value of the record.

In response to the batch job executing a database operation on a record that does not yet exist in the development environment, the record with the final value is copied from production environment to the development environment. In the development environment, using the journal in the identified window, the final value of the record is rolled back to the value of the record at the beginning of the window.

As an alternative, instead of copying the final value and then rolling back to the initial value, the journal entry corresponding to the first database operation could be used to provide the initial value as well.

In response to the initial value of the record having been recreated in the development environment, the database operation can proceed on the development copy.

In response to the batch job using an external resource, such as an external program binary, the external resource is copied from the production environment to the development environment if it does not already exist in the development environment.

Thus, an embodiment selectively synchronizes only that data and external resources from the production environment that had any involvement in the events that occurred within a precisely defined relevant window of log journal entries. By starting the special debugging session which intercepts READ, UPDATE, WRITE and DELETE database operations, the debugger copies only the required entries from the required files, performs rollback of the entry according to the journal entry in the identified window, and applies the actual database operation.

Responsive to the special debug session reaching the point just before the failure, the data in the subset of data in the development environment is in the state it was just before the error occurred. The subset of data only includes a limited amount of data that participates in the window. The window is a precisely defined boundary of events within which the problem occurred in the production environment. The developer can continue to use the special debugging session to examine the state of the environment and isolate the cause of the problem in the development environment. Other tools can be used to look at the state of the minimal data related to the failure and use that to help gain insight into the problem as well.

A method of an embodiment described herein, when implemented to execute on a device or data processing system, substantially advances the functionality of that device or data processing system in selective data synchronization to troubleshoot production environment failures. For example, in the event of a problem in a production environment, a prior-art method of debugging requires cloning the entire data of the production environment and searching for the cause of the problem within an arbitrary collection of events. An embodiment systematically identifies the portions of the production environment data that is manipulated or touched within a precisely defined window of event. An embodiment eliminates those portions of the production environment data that are either not touched in the window or are touched only by operations external to a batch job. An embodiment rolls back or resets this limited amount of data in the development environment to the beginning of the window, thereby configuring the development environment for a more contained and more precise debugging with greater probability of finding the cause of the problem than the prior-art. This manner of configuring a development environment for debugging a production problem is unavailable in the prior-art. Thus, a substantial advancement of such devices or data processing systems by executing a method of an embodiment is in improving the probability of finding the cause of the problem, and in limiting the amount of data and events brought over from the production environment into the development environment to find the cause.

The illustrative embodiments are described with respect to certain master file, files, log journals, batch jobs, transactions, entries, records, events, window, touches, operations, production environment, development environment, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
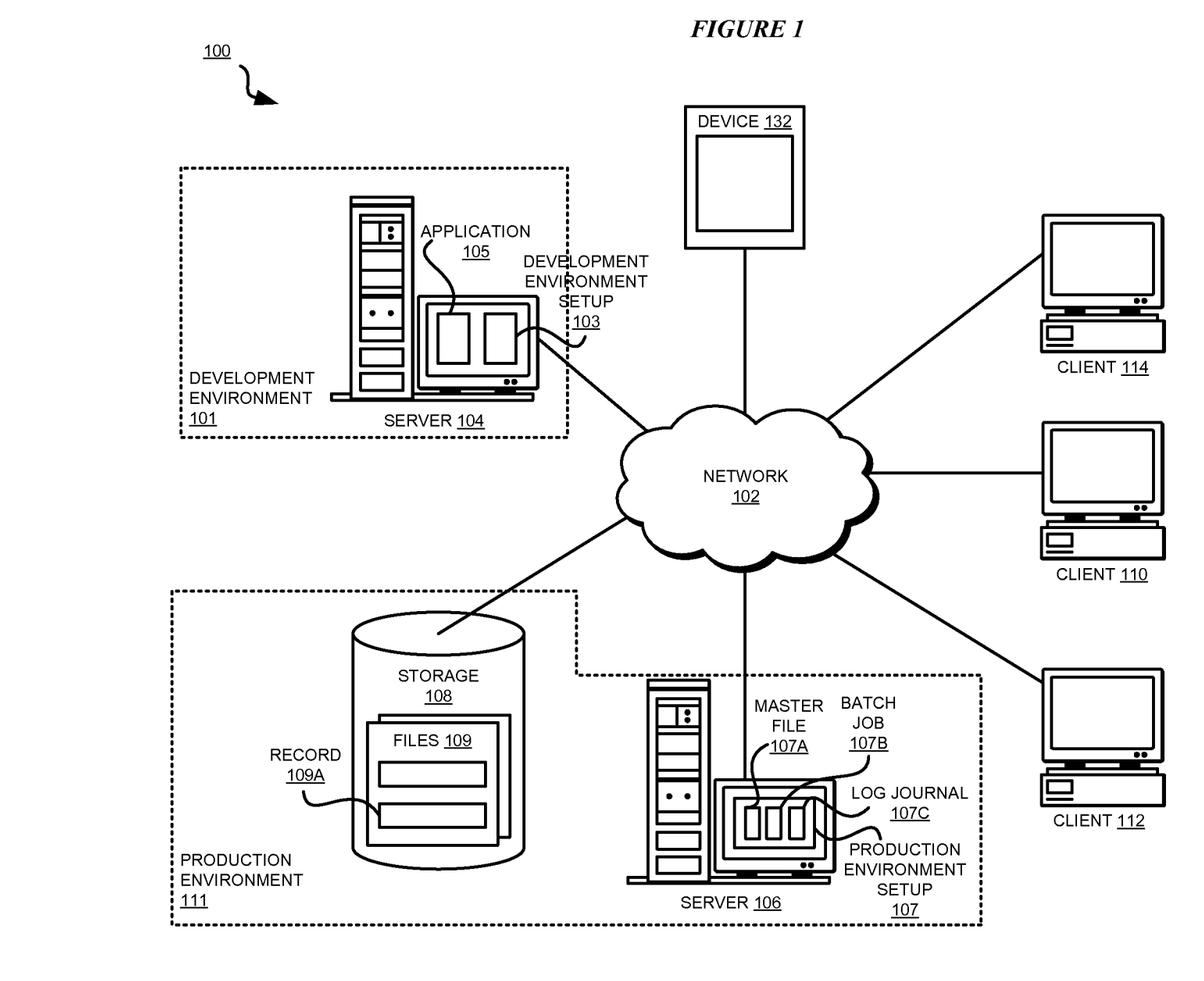
FIG. 1 depicts a block diagram of a network of data processing systems in which illustrative embodiments may be implemented.
Figure 2:
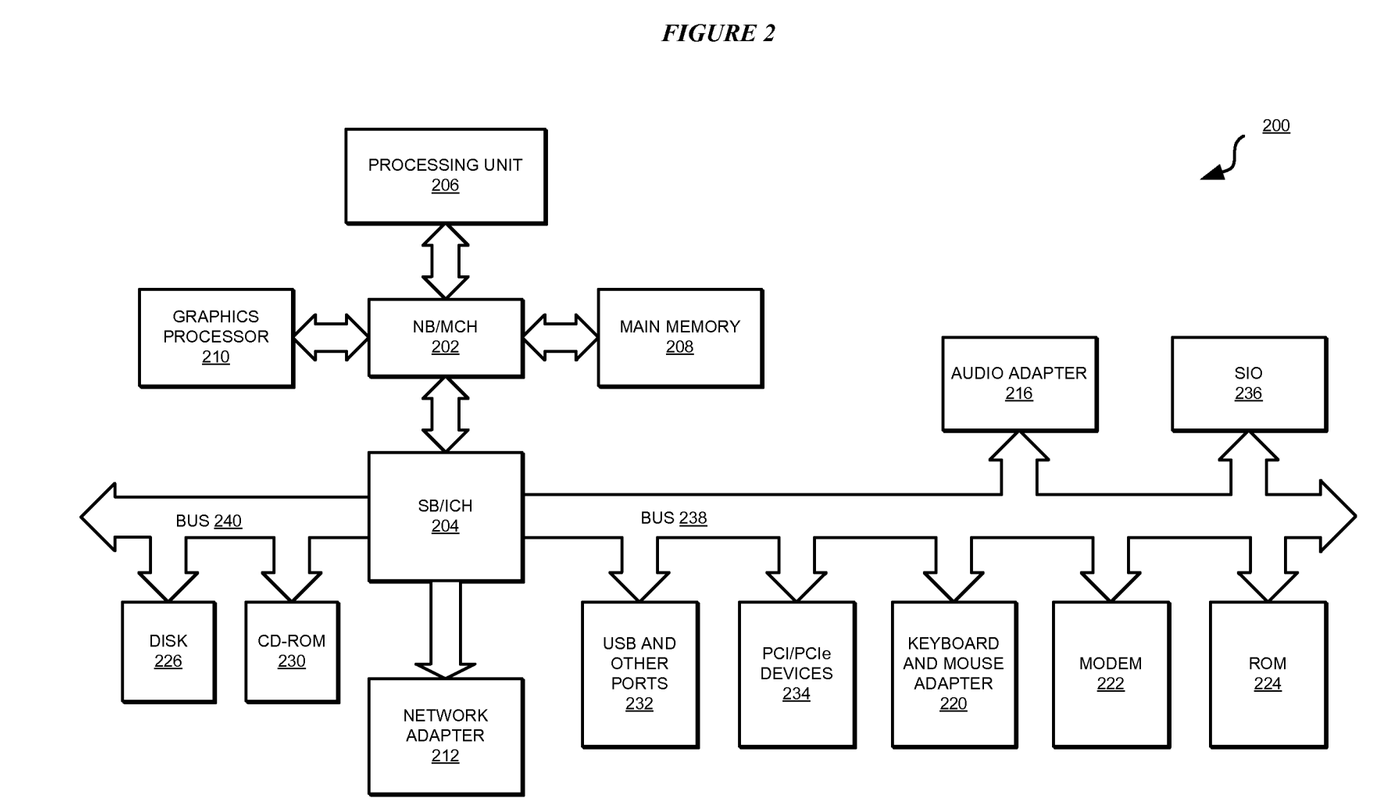
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume that setup 103 allows server 104 to participate in development environment 101. Application 105 implements an embodiment described herein. Similarly, setup 107 allows server 106 to participate in production environment 111. For example, setup 107 includes master file 107A, batch job 107B, and log journal 107C. Files 109 are referenced in master file 107A. A record in such a file, e.g., record 109A in file 109, is touched by a transaction in batch job 107B, and such touch is recorded in log journal 107C.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
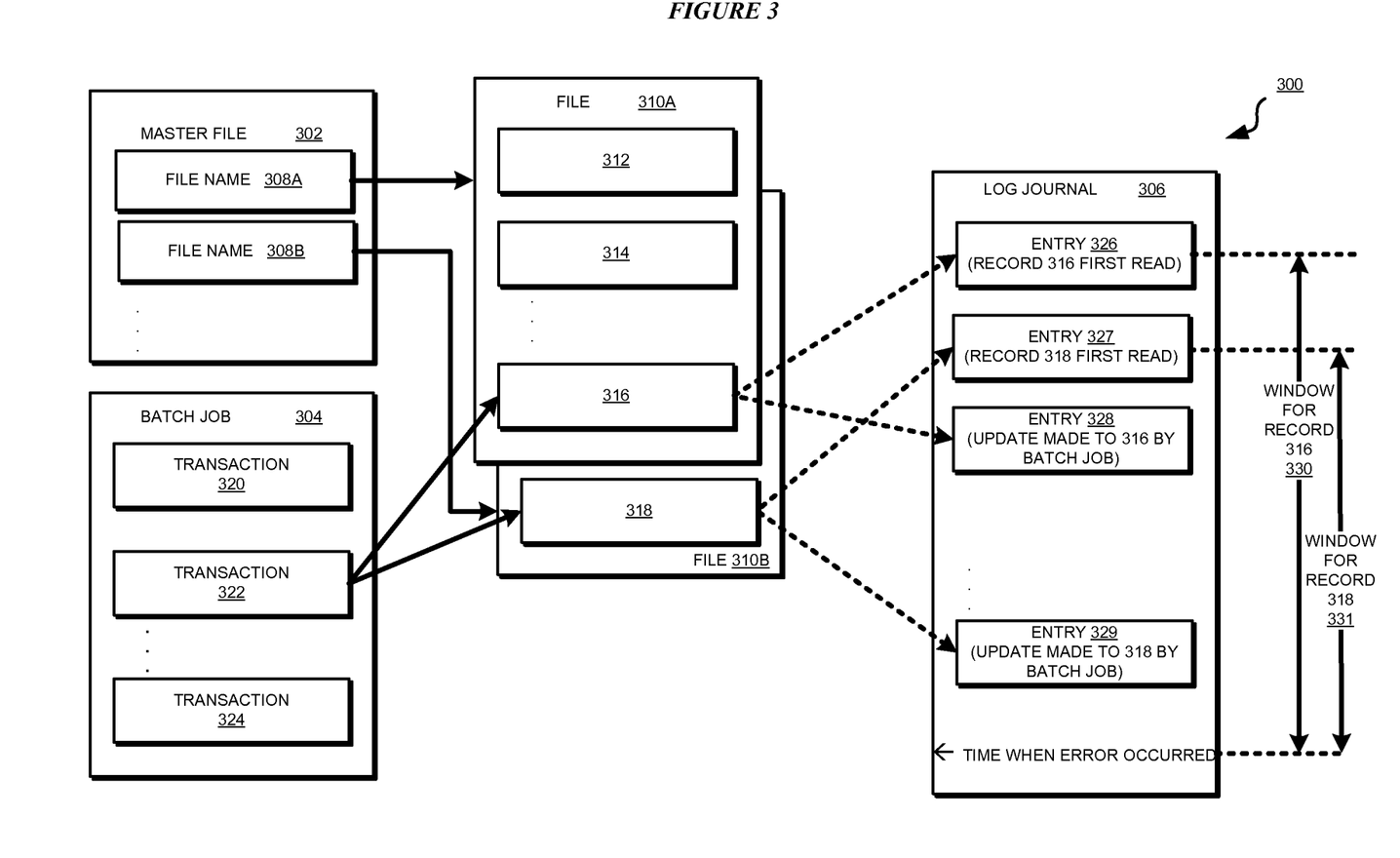
FIG. 3 depicts a block diagram of an example configuration for selective data synchronization to troubleshoot production environment failures in accordance with an illustrative embodiment.

With reference to FIG. 3, this figure depicts a block diagram of an example configuration for selective data synchronization to troubleshoot production environment failures in accordance with an illustrative embodiment. Configuration 300 depicts a production environment, such as production environment 111 in FIG. 1. Master file 302 is an example of master file 107A, batch job 304 is an example of batch job 107B, and log journal 306 is an example of log journal 107C in FIG. 1.

Reference 308A and 308B are example references in master file 302, and reference files 310A and 310B, respectively. Files 310A and 310B are each an example of file 109 in FIG. 1. Records 312, 314, and up to record 316 are example records in file 310A. Record 318 is an example record in file 310B.

Batch job 304 includes transaction 320 and any number of such transactions, such as transactions 322 up to 324. As a non-limiting example only for illustration purposes, assume that during the operation of production environment 300, transaction 322 touches record 316 in file 310A and record 318 in file 310B.

In response to such touching operations, log journal 306 includes entries 326 through 329. For example, entry 326 contains information about record 316 during the first READ. Entry 327 contains information about record 318 during the first READ. Entry 328 contains information about record 316 after update being made by the batch job as part of transaction 322. Entry 329 contains information about record 318 after update being made by the batch job as part of transaction 322. Any number of such entries can exist in log journal as described herein.

As a non-limiting example only for illustration purposes, entry 326 marks the beginning of window 330 for record 316. Entry 327 marks the beginning of window 331 for record 318. Both windows 330 and 331 end at the point in journal 306 which corresponds to the time of the failure.

Figure 4:
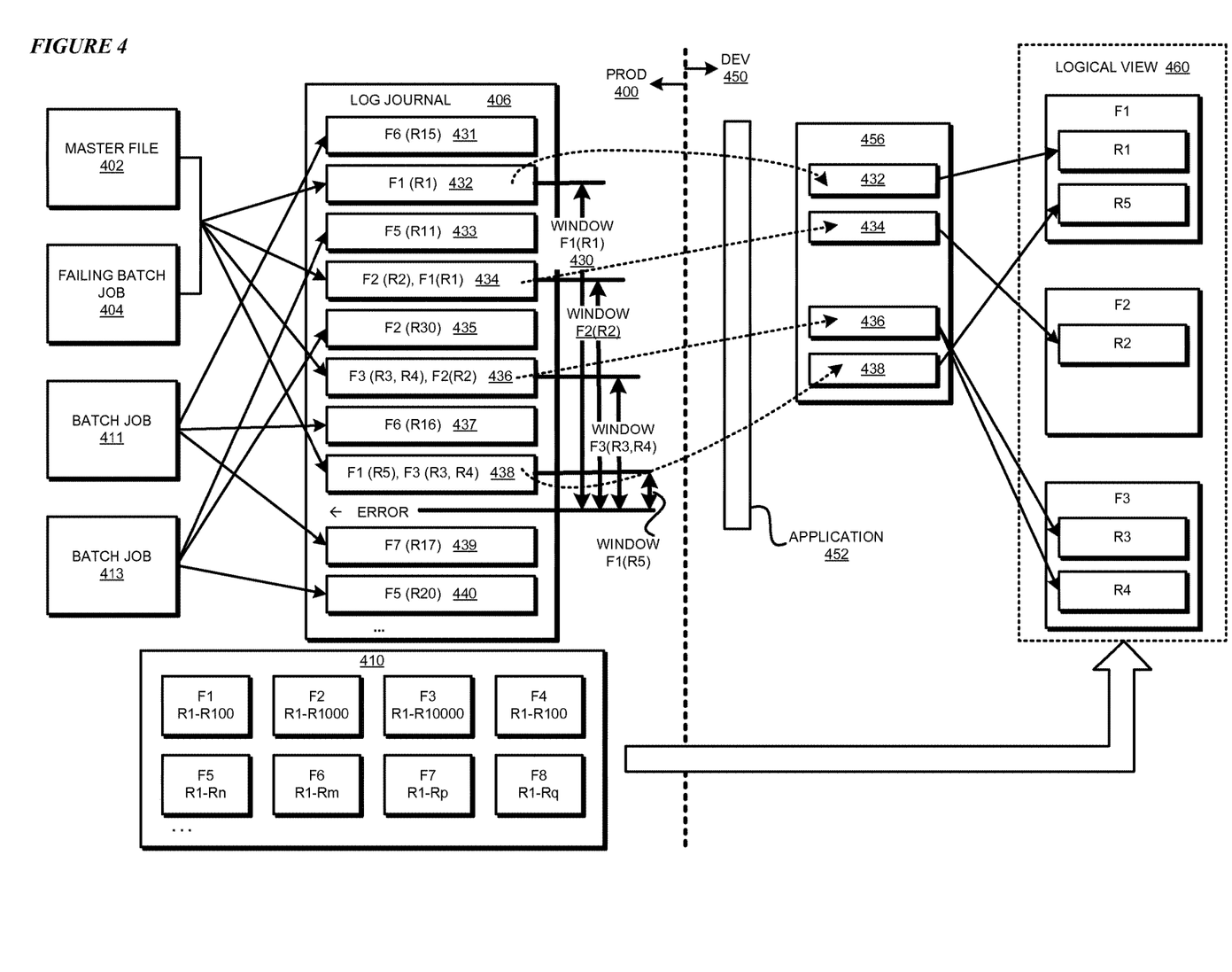
FIG. 4 depicts a block diagram of a process for constructing a development environment in accordance with an illustrative embodiment.

With reference to FIG. 4, this figure depicts a block diagram of a process for constructing a development environment in accordance with an illustrative embodiment. Production environment 400 is an example of production environment 300 in FIG. 3. Development environment 450 is an example of development environment 101 in FIG. 1.

Master file 402 is an example of master file 302, batch job 404 is an example of batch job 304, and log journal 406 is an example of log journal 306 in FIG. 3. Repository 410 includes any number of files, such as non-limiting example files F1, F2, F3, F4, F5, F6, F7, and F8. As an example, suppose that file F1 includes 100 records R1-R100; file F2 includes 1000 records R1-R1000; file F3 includes 10000 records R1-R10000, file F4 includes 100 records R1-R100, file F5 includes n records R1-Rn, file F6 includes m records R1-Rm, file F7 includes p records R1-Rp, and file F8 includes q records R1-Rq.

The transactions in batch job 404, using file references in master file 402, touch, or in some manner manipulate, a record in a file in repository 410. Batch jobs 411 and 413 are any number of other processes in the production environment 400, which also manipulate some records in some files in repository 410. Note that the entries in log journal 406 are in chronological order of the file touches occurring in production environment 400.

Accordingly, suppose, for example, batch job 411 touches record R15 in file F6, causing entry 431 to be recorded in log journal 406 at time T1. A transaction in batch job 404 touches, e.g., performs a first READ of, record R1 in file F1, causing entry 432 to be recorded in log journal 406 at a time T2 after time T1. Batch job 413 touches record R11 in file F5, causing entry 433 to be recorded in log journal 406 at a time T3 after time T2. A transaction in batch job 404 touches, e.g., performs a first READ of, record R2 in file F2 and a manipulation of record R1 in file F1, causing entry 434 to be recorded in log journal 406 at a time T4 after time T3. Batch job 413 touches record R30 in file F2, causing entry 435 to be recorded in log journal 406 at a time T5 after time T4. A transaction in batch job 404 touches, e.g., performs a first READ of, records R3 and R4 in file F3 and a manipulation of record R2 in file F2, causing entry 436 to be recorded in log journal 406 at a time T6 after time T5. Batch job 411 touches record R16 in file F6, causing entry 437 to be recorded in log journal 406 at a time T7 after time T6. A transaction in batch job 404 touches, e.g., performs a first READ of record R5 in file F1 and manipulates records R3 and R4 in file F3 and WRITES record R5 in file F1, causing entry 438 to be recorded in log journal 406 at a time T8 after time T7. An error occurs at time T9 after time T8. Batch job 411 touches record R17 in file F7, causing entry 439 to be recorded in log journal 406 at a time T10 after time T9. Batch job 413 touches record R20 in file F5, causing entry 440 to be recorded in log journal 406 at a time T11 after time T10.

As can be seen from example entries 431-440 in log journal 406, the first touch of a file listed in master file 402 by a transaction in batch job 404 occurs at entry 432, which forms the beginning of window 430 for that touched record in that touched file, to wit, file F1 record R1. Other windows for other touched records in other files similarly begin at different entries in journal 406 where those records are first touched. Assume that a problem occurs after a transaction from batch job 404 is processed at entry 438, which forms the end of window 430 and each window for each record that was touched.

Application 452 is an example of application 105 in FIG. 1. Application 452 identifies entries 432 and 438 as the beginning and ending entries, respectively, of window 430 for F1(R1). Application 452 similarly identifies entries 434 and 438 as the beginning and ending entries, respectively, of a window for F2(R2); entries 436 and 438 as the beginning and ending entries, respectively, of a window for F3(R3, R4); and entry 438 as the beginning and ending entry of a window for F1(R5).

Application 452 constructs filtered log journal 456. Filtered log journal 456 includes entries 432, 434, 436, and 438. Application 452 determines that records R1 and R5 of File F1 are touched by at least one entry in filtered log journal 456.

Thus, application 452 copies, into subset of data 460 in development environment 450, only records R1 and R5 of file F1—not all 100 records of file F1—from repository 410 in production environment 400. Similarly, application 452 copies into subset of data 460 only records R2 of file F2—not all 1000 records—from repository 410. Application 452 also copies into subset of data 460 only records R3 and R4 of file F3—not all 10000 records of file F3—from repository 410.

As can be seen, application 452 has constructed development environment 450 with comparatively very few log journal entries, and very small amount of data as compared to production environment 400.

Figure 5:
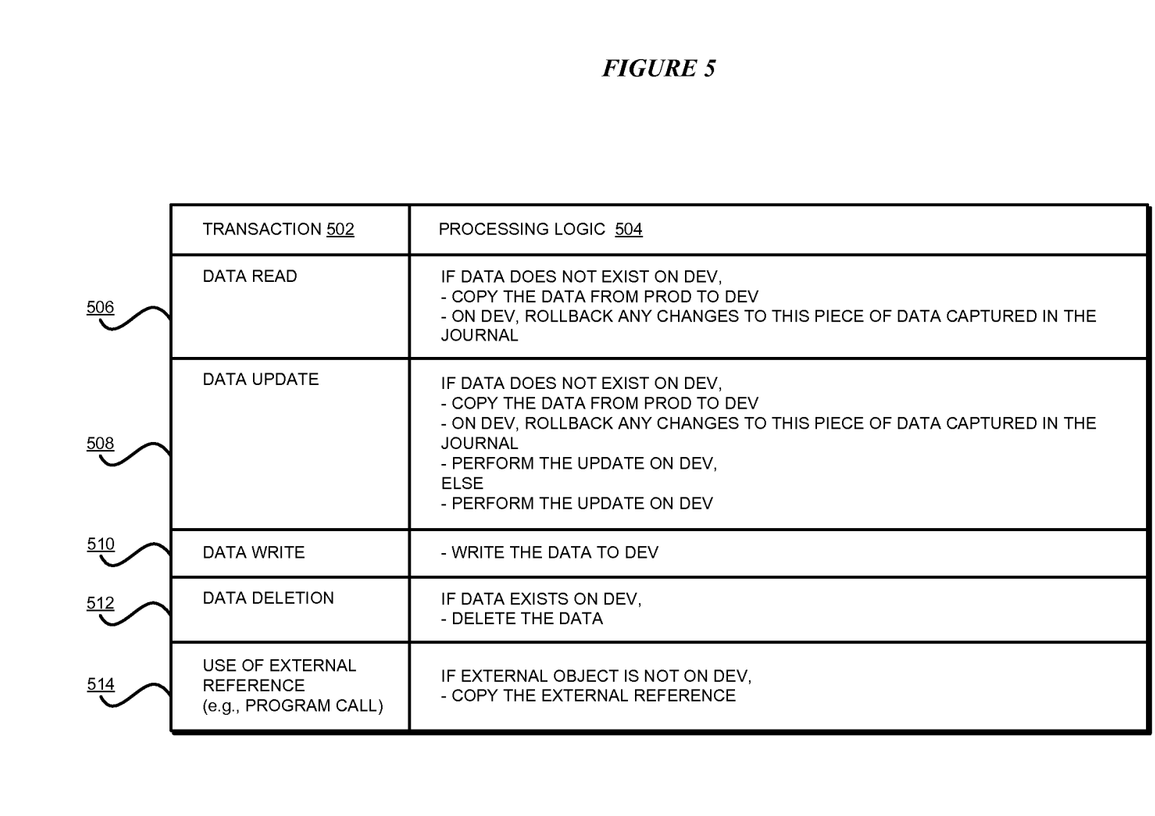
FIG. 5 depicts a table of some example touches using rollback operation in a development environment in accordance with an illustrative embodiment.

With reference to FIG. 5, this figure depicts a table of some example touches using rollback operation in a development environment in accordance with an illustrative embodiment. Transactions 502 are transactions in a batch job, such as in batch job 404 in FIG. 4, or data manipulation operations corresponding those transactions. Processing logic 504 is example logic implemented in any suitable manner, in or by an embodiment, e.g., application 452 in FIG. 4, to process the operations in transactions 502.

Suppose, as shown in row 506, the operation in a transaction touches a record in a file by reading the data in that record. The application causes the processing logic of row 506 to be performed for that record in the subset of data in the development environment. For example, if the record does not exist, or if a value (data) in the record does not exist in the logical view, the application causes the data to be copied from the file in the production environment to the logical view in the development environment. The application then causes a rollback of the data to the beginning of the window in the log journal using the entries from the filtered log journal in the development environment. Now the data is reset to the beginning of the window. The operation of row 506 will then read the same data in the development environment as was available to the same operation in the production environment.

As another example, suppose, as shown in row 508, the operation in a transaction touches a record in a file by updating the data in that record. The application causes the processing logic of row 508 to be performed for that record in the logical view in the development environment. For example, if the record does not exist, or if a value (data) in the record does not exist in the logical view, the application causes the data to be copied from the file in the production environment to the logical view in the development environment. The application then causes a rollback of the data to the beginning of the window in the log journal using the entries from the filtered log journal in the development environment. Now the data is reset to the beginning of the window. The operation of row 508 will then update the same data in the development environment as was available for update to the same operation in the production environment.

On the other hand, in some cases, the data needed by an operation may already be available in the subset of data in of the development environment. If the data is already available in the logical view, the application allows the operation of row 508 to update the data.

If, as in row 510, the operation calls for writing some data, the application allows the operation to write the data in the logical view in the development environment. If the file containing the data does not exist, the file will be created. If, as in row 512, the operation calls for deleting some data, the application allows the operation to delete the data from the development environment, if the data exists in the logical view in the development environment.

In some cases, an operation, e.g., the operation in row 514, may make an external reference as described herein. The external reference is not limited to files or data but can also include functional operations such as calling another program to execute. If, as in row 514, the operation calls for an external reference, the application copies the target of the external reference from the production environment to the development environment, or creates the target of the external reference in the development environment in another manner, or enables an invocation of the external reference from the development environment in a suitable manner.

Figure 6:
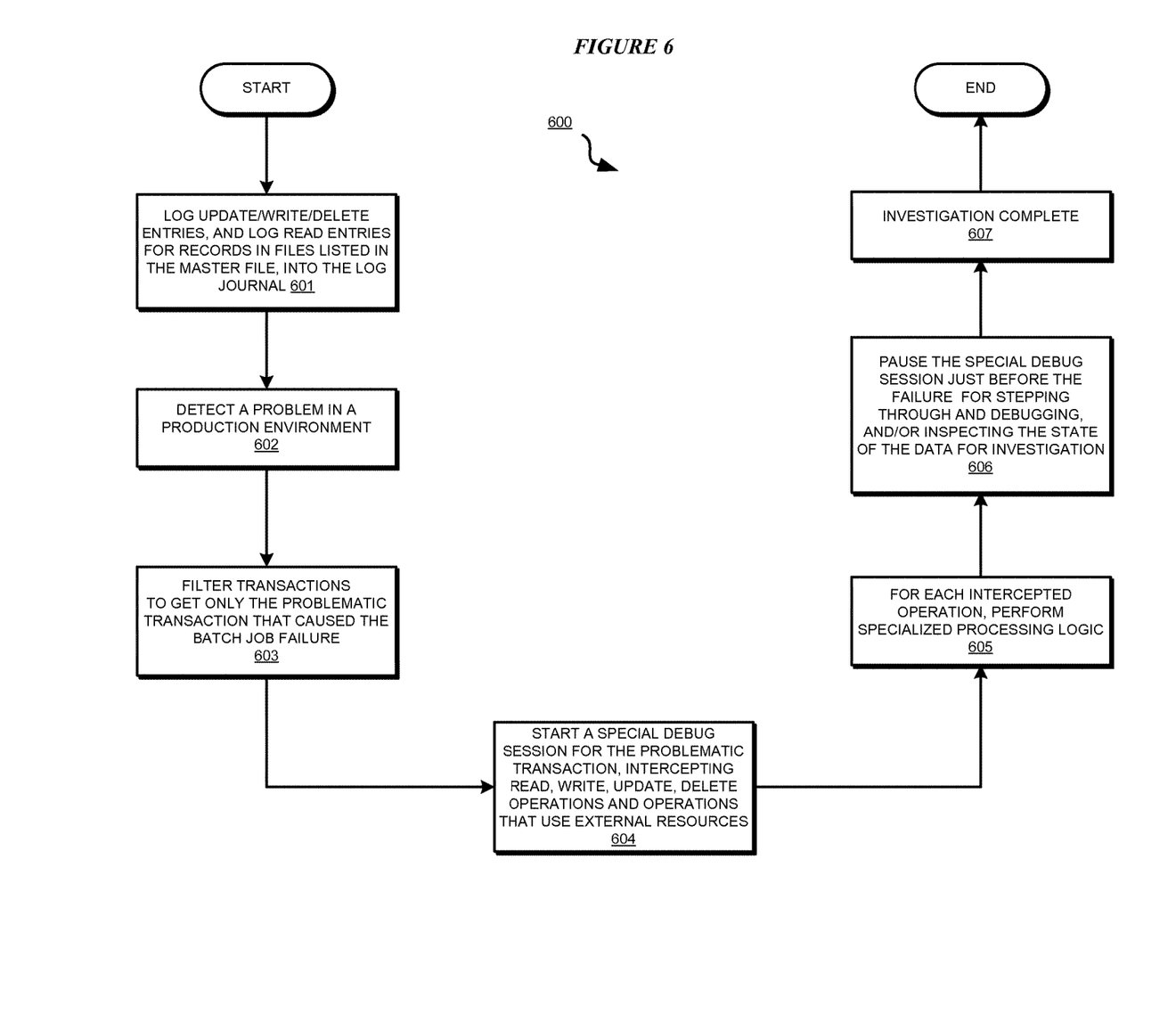
FIG. 6 depicts a flowchart of an example process for selective data synchronization to troubleshoot production environment failures in accordance with an illustrative embodiment.

With reference to FIG. 6, this figure depicts a flowchart of an example process for selective data synchronization to troubleshoot production environment failures in accordance with an illustrative embodiment. Process 600 can be implemented in application 452 in FIG. 4.

The application causes the operating system to log the UPDATE/WRITE/DELETE entries into the log journal and READ entries for records in files listed in the master file are logged by database read triggers into the log journal (block 601).

The application detects a problem in a production environment (block 602).

Transactions are filtered to get only the problematic transaction which caused the batch job failure (block 603).

Start a special debug session for the problematic transaction, intercepting READ, WRITE, UPDATE, DELETE operations, and operations that use external resources (block 604).

For each intercepted operation (block 605), perform specialized processing logic as follows—

For database operations, if the data does not already exist in development environment, determine a window in the log journal, where the first entry is read in response to the record being first touched; last entry is the last one captured before the failure. Filter out only entries that correspond to this record in the intercepted operation. Copy the final value from production environment to development environment. Roll back the final value to the initial value indicated by the first entry in the window. In response to the initial value of data having been moved to the development environment, perform the database operation as usual.

For references to external resources, copy the external resources from production environment to development environment.

The application pauses the special debug session just before the failure and presents the session in a state that is ready for stepping through and debugging, and/or inspecting the state of the data for investigation (block 606).

The application allows the investigation of the production problem to be completed using this special debug session (block 607).

Thus, a computer implemented method, system or apparatus, and computer program product are provided in the illustrative embodiments for selective data synchronization to troubleshoot production environment failures. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    logging, in a production environment, a first entry in a log journal, the first entry recording performance of a read operation on a record stored in a file, the first entry comprising the record and a value stored in the record, the file being listed in a master file of a batch job;
    selecting a problematic transaction in the batch job;
    intercepting, for the problematic transaction, a set of operations performed by the problematic transaction, the set of operations comprising a combination of the read operation, a write operation, an update operation, and a delete operation;
    determining a window of entries in the log journal, wherein the first entry is a beginning entry in the window of entries and an ending entry is a last entry captured in the log journal before the problematic transaction occurred;
    constructing from the window of entries, a filtered window of entries presenting only the entries that are logged for a record manipulated by the problematic transaction;
    constructing a development environment, constructing the development environment comprising:
    copying, from the production environment to the development environment, a final value of the record, the final value of the record being stored in a second entry within the filtered window of entries, wherein the final value of the record is a value of the record when the problematic transaction occurred;
    copying, from the production environment to the development environment, an external resource used in the problematic transaction;
    rolling back, in the development environment, the final value of the record to an initial value of the record stored in the beginning entry, the beginning entry being present within the filtered window of entries; and
    performing, responsive to the rolling back, the problematic transaction in the development environment.

2. The method of claim 1, further comprising:
    including, from a set of records in a set of files in the production environment, in the development environment only a subset of records from a subset of files that are manipulated by an operation in the problematic transaction, the development environment including the record in the file; and setting for each record in the subset of records, a corresponding initial value, each corresponding initial value being present in the corresponding record from the subset of records at a time of the beginning entry.

3. The method of claim 1, wherein the determining is responsive to finding that the record is absent in the development environment.

4. The method of claim 1, wherein the intercepting occurs in a debug session in the production environment.

5. The method of claim 1, wherein the selecting is responsive to detecting an error in the production environment.

6. The method of claim 1, further comprising:
logging an additional entry in the log journal, the additional entry recording performance of at least one of the update operation, the write operation, and the delete operation.

7. The method of claim 1, wherein the method is embodied in a computer program product comprising one or more computer-readable storage devices and computer-readable program instructions which are stored on the one or more computer-readable storage devices and executed by one or more processors.

8. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

9. The method of claim 1, further comprising:
constructing a plurality of windows, each window in the plurality of windows corresponding to a different touched record, wherein each different touched record is a member of at least one of a plurality of files listed in the master file, wherein the constructing the plurality of windows further comprises:
beginning a first window in the plurality of windows at a first time;
beginning a second window in the plurality of windows at a second time; and
ending the first window and the second window at a common third time, wherein the common third time is a time at which an error in the problematic transaction occurs.

10. A computer program product comprising one or more computer-readable storage devices, and program instructions stored on at least one of the one or more storage devices, the stored program instructions comprising:
program instructions to log, in a production environment, a first entry in a log journal, the first entry recording performance of a read operation on a record stored in a file, the first entry comprising the record and a value stored in the record, the file being listed in a master file of a batch job;
program instructions to select a problematic transaction in the batch job;
intercepting, for the problematic transaction, a set of operations performed by the problematic transaction, the set of operations comprising a combination of the read operation, a write operation, an update operation, and a delete operation; program instructions to determine a window of entries in the log journal, wherein the first entry is a beginning entry in the window of entries and an ending entry is a last entry captured in the log journal before the problematic transaction occurred;
program instructions to construct from the window of entries, a filtered window of entries presenting only the log journal entries that are logged for a record manipulated by the problematic transaction, the record manipulated by the problematic transaction being stored in a file operated on by the problematic transaction, each entry in the filtered window of entries comprising the record and a value stored in the record;
program instructions to construct a development environment, comprising:
program instructions to copy, from the production environment to the development environment, a final value of the record, the final value of the record being stored in a second entry within the filtered window of entries, wherein the final value of the record is a value of the record when the problematic transaction occurred;
program instructions to copy, from the production environment to the development environment, an external resource used in the problematic transaction;
program instructions to roll back, in the development environment, the final value of the record to an initial value of the record stored in the beginning entry, the beginning entry being present within the filtered window of entries;
and program instructions to perform, responsive to the rolling back, the problematic transaction in the development environment.

11. The computer program product of claim 10, the stored program instructions further comprising:
program instructions to include, from a set of records in a set of files in the production environment, in the development environment only a subset of records from a subset of files that are manipulated by an operation in the problematic transaction, the development environment including the record in the file; and
program instructions to set for each record in the subset of records, a corresponding initial value, each corresponding initial value being present in the corresponding record from the subset of records at a time of the beginning entry.

12. The computer program product of claim 10, wherein the window of entries in the log journal are determined in response to finding that the record is absent in the development environment.

13. The computer program product of claim 10, wherein intercepting the set of operations performed by the problematic transaction occurs in a debug session in the production environment.

14. The computer program product of claim 10, wherein selecting the problematic transaction in the batch job is responsive to detecting an error in the production environment.

15. The computer program product of claim 10, the stored program instructions further comprising:
program instructions to log an additional entry in the log journal, the additional entry documenting performance of at least one of the update operation, the write operation, and the delete operation.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to log, in a production environment, a first entry in a log journal, the first entry recording performance of a read operation on a record stored in a file, the first entry comprising the record and a value stored in the record, the file being listed in a master file of a batch job;

program instructions to select a problematic transaction in the batch job;

intercepting, for the problematic transaction, a set of operations performed by the problematic transaction, the set of operations comprising a combination of the read operation, a write operation, an update operation, and a delete operation; program instructions to determine a window of entries in the log journal, wherein the first entry is a beginning entry in the window of entries and an ending entry is a last entry captured in the log journal before the problematic transaction occurred;

program instructions to construct from the window of entries, a filtered window of entries presenting only the log journal entries that are logged for a record manipulated by the problematic transaction, the record manipulated by the problematic transaction being stored in a file operated on by the problematic transaction, each entry in the filtered window of entries comprising the record and a value stored in the record;

program instructions to construct a development environment, comprising:

program instructions to copy, from the production environment to the development environment, a final value of the record, the final value of the record being stored in a second entry within the filtered window of entries, wherein the final value of the record is a value of the record when the problematic transaction occurred;

program instructions to copy, from the production environment to the development environment, an external resource used in the problematic transaction;

program instructions to roll back, in the development environment the final value of the record to an initial value of the record stored in the beginning entry, the beginning entry being present within the filtered window of entries;

and program instructions to perform, responsive to the rolling back, the problematic transaction in the development environment.

17. The computer system of claim 16, the stored program instructions further comprising:

program instructions to include, from a set of records in a set of files in the production environment, in the development environment only a subset of records from a subset of files that are manipulated by an operation in the problematic transaction, the development environment including the record in the file; and program instructions to set for each record in the subset of records, a corresponding initial value, each corresponding initial value being present in the corresponding record from the subset of records at a time of the beginning entry.

\* \* \* \* \*